UNITED STATES PATENT OFFICE.

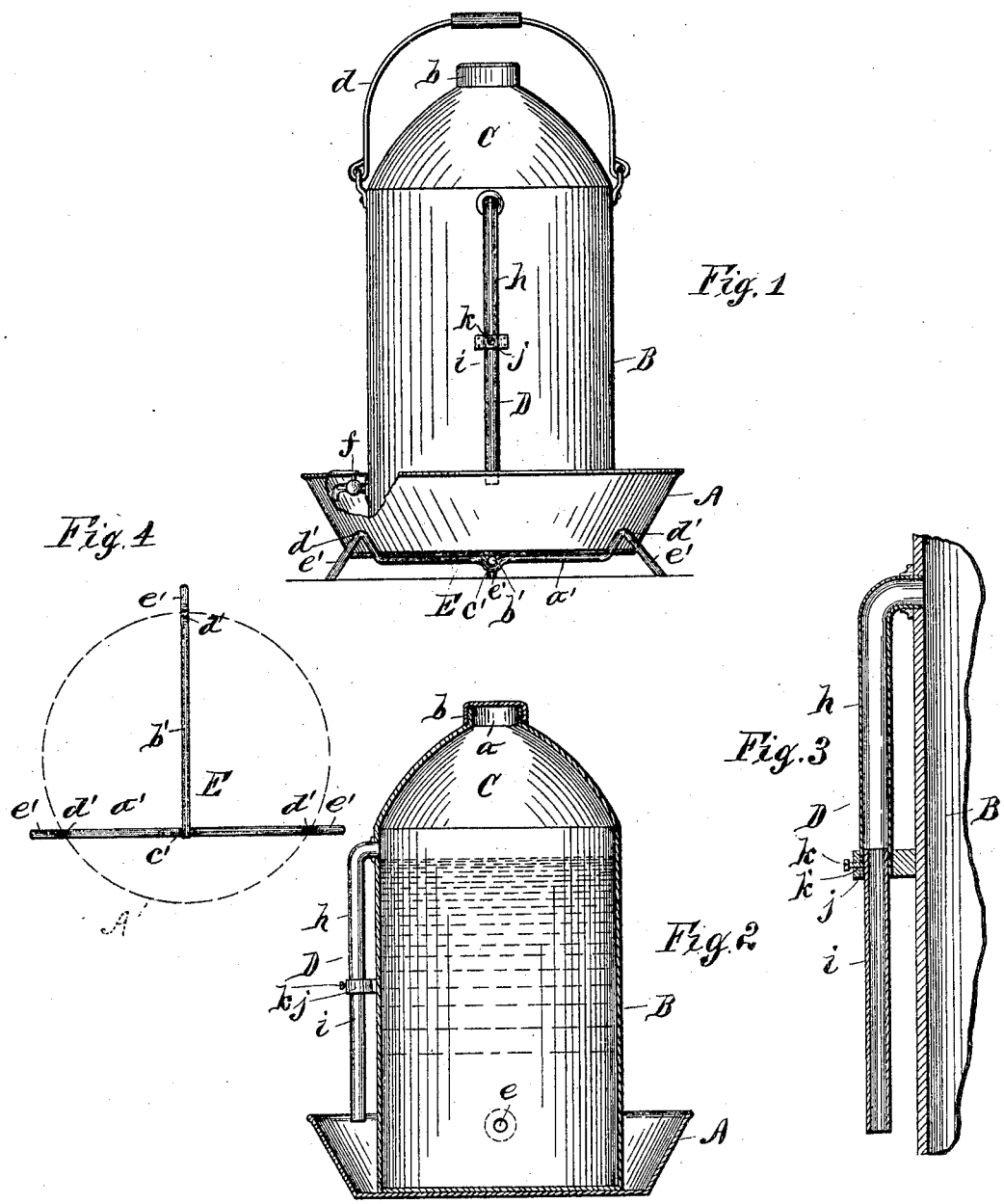

NICHOLAS H. BROWN, OF LAFARGEVILLE, NEW YORK.

POULTRY-FOUNTAIN.

No. 798,493. Specification of Letters Patent. Patented Aug. 29, 1905.

Application filed March 20, 1905. Serial No. 250,923.

*To all whom it may concern:*

Be it known that I, NICHOLAS H. BROWN, of Lafargeville, in the county of Jefferson, in the State of New York, have invented new and useful Improvements in Poultry-Fountains, of which the following, taken in connection with the accompanying drawings, is a full, clear, and exact description.

This invention relates to apparatus designed for furnishing fowls and small live stock with drinking-water, and it has special reference to the class of so-called "poultry-fountains" which embody a shallow drinking pan or trough in which is seated a water-containing tank or reservoir provided with means for automatically supplying the pan proportionally to the amount of water taken from the pan by the fowls or live stock, and thereby maintaining a uniform water-level in the said pan.

The object of the present invention is to produce an apparatus which shall be more efficient in its use, simple in construction, and at the same time inexpensive to manufacture.

To that end the invention consists in the novel construction and arrangement of the component parts of the poultry-fountain, as hereinafter fully described, and set forth in the claims.

In the accompanying drawings, Figure 1 is a side elevation of a poultry-fountain embodying my improvements. Fig. 2 is a vertical section of the same. Fig. 3 is an enlarged longitudinal section of the air-vent means, and Fig. 4 is a plan view of the fountain-support.

Referring to the drawings, A denotes an open-top drinking-pan, which may be any style or shape.

B represents a water-containing tank or reservoir which is designed to be air-tight and is preferably provided with crowning top C, so as to prevent the poultry or other fowls from perching thereon. The said top has an opening $a$, through which to fill the same and which is provided with a screw-threaded cap $b$. The said tank is seated removably in the pan A and is provided with a bail $d$, whereby the same can be conveniently carried when required for refilling. In the lower portion of said tank is an outlet-opening $e$, through which the water is discharged into the pan. I provide this opening with a faucet $f$, which has the end of its spout extending downward and disposed slightly below the rim of the pan. By employing this faucet the dirt and other matter deposited in the pan are prevented from entering the tank incident to the agitation of the water in the pan, thereby maintaining a cleanliness and purity of the water in the tank.

D denotes a vertically-arranged air-vent pipe, which communicates at its upper end with the tank B, above the water-line thereof, and has its lower end disposed within the pan, slightly below the rim thereof. The contact of this lower end of the pipe with the water in the pan forms a seal, closing the pipe to exclude air. Thus when the water-level in said pan is lowered by the drinking of the fowls therefrom the air is permitted to enter said end, thereby causing a discharge of water from the tank through the aforesaid opening $e$, it being understood that the faucet is always open excepting during the filling of the tank. When a sufficient amount of water has been admitted into the pan to raise the water-level to close the lower end of the aforesaid pipe, the air is prevented from entering the pipe, thereby sealing the pipe and automatically cutting off the discharge of water from the tank. By this arrangement the water in the pan is maintained at a uniform level. The said vent-pipe D is composed of an upper section $h$, rigidly fastened to the tank, and a lower telescoping section $i$, thereby rendering the said pipe longitudinally adjustable to accommodate pans of different depths and also regulate the depth of water in the pan as desired. I prefer to employ a ring $j$, rigidly secured to the side of the tank, in which ring the lower end of the pipe-section $h$ is fastened, and provide a set-screw $k$, working in the ring and passing freely through an aperture $k'$ in the said section so as to engage the other pipe-section $i$, whereby the latter is retained in its adjusted position.

E represents a support for the fountain, which support serves to sustain the fountain firmly on the ground or floor of a building in which the same may be placed, and it serves to permit a free circulation of air under the pan and prevent freezing of the pan to the ground or floor during cold weather. I prefer to construct this support in the form of a tripod which consists of two horizontal rods $a'$ $b'$, disposed at right angles to each other, the rod $a'$ being formed with a depression $c'$ at its central portion, in which depression is rigidly secured the inner end of the other rod $b'$. These rods are bent upwardly at their outer end portions to form abutments $d'$ $d'$, which are engaged by the bottom of the pan A to retain the latter thereon, and they are thence bent downwardly and outwardly to form legs $e'$ $e'$.

What I claim is—

1. A poultry-fountain comprising a drinking-pan, a water-containing tank or reservoir seated removably in the pan and provided in its lower portion with a discharge-opening for supplying the water to the pan, and an extensible air-vent pipe leading from the upper portion of the tank into the pan and serving to control the discharge from said tank as set forth.

2. A poultry-fountain comprising a drinking-pan, a water-containing tank or reservoir seated in the said pan and provided with a discharge-opening in its lower portion for supplying the water to the pan, a vertically-arranged air-vent pipe composed of two telescoping sections, the upper section rigidly connected at its top to the tank above the water-line thereof, and the lower section adapted to be adjusted longitudinally in the other section and having its lower end communicating with the drinking-pan below its rim to form a water seal thereat and thereby automatically controlling the discharge of water from said tank as set forth.

3. A poultry-fountain comprising a drinking-pan, a water-containing tank or reservoir seated removably in the said pan and provided with a discharge-opening in its lower portion for supplying the water to the said pan, a vertically-arranged air-vent pipe composed of two telescoping sections and communicating with the tank above its water-level and with the pan below its rim to form a water seal, the upper pipe-section being rigid, the lower pipe-section being longitudinally adjustable to accommodate pans of different depths and to regulate the depth of water in said pan, and means for sustaining the said lower pipe-section in its position as set forth.

NICHOLAS H. BROWN.

Witnesses:
J. J. LAASS,
L. H. FULMER.